United States Patent
Stevenson et al.

(10) Patent No.: US 6,776,954 B1
(45) Date of Patent: Aug. 17, 2004

(54) RECYCLE METHODS FOR WATER BASED POWDER INJECTION MOLDING COMPOUNDS

(75) Inventors: James F. Stevenson, Morristown, NJ (US); Gary Marsh, Pittstown, NJ (US); Jerry C. LaSalle, Montclair, NJ (US); Mohammad Behi, Lake Hiawatha, NJ (US)

(73) Assignee: Honeywell International Inc., Morristown, NJ (US)

( * ) Notice: Subject to any disclaimer, the term of this patent is extended or adjusted under 35 U.S.C. 154(b) by 544 days.

(21) Appl. No.: 09/583,604

(22) Filed: May 31, 2000

(51) Int. Cl.[7] .................................................. B22F 8/00
(52) U.S. Cl. ............................ 419/30; 419/36; 75/228; 264/37.29; 264/37.33
(58) Field of Search .................. 419/30, 36; 264/37.29, 264/37.33; 75/228

(56) References Cited

U.S. PATENT DOCUMENTS

| | | | |
|---|---|---|---|
| 4,734,237 A | | 3/1988 | Fanelli et al. ............... 264/122 |
| 4,880,792 A | * | 11/1989 | Yoshioka et al. ........... 425/190 |
| 5,238,627 A | * | 8/1993 | Matsuhisa et al. .......... 264/645 |
| 5,250,251 A | * | 10/1993 | Fanelli et al. |
| 5,746,957 A | * | 5/1998 | Fanelli et al. |
| 5,879,078 A | * | 3/1999 | Tsuzuki et al. ............. 366/137 |
| 6,146,560 A | * | 11/2000 | Behi et al. .................. 264/37.1 |
| 6,171,360 B1 | * | 1/2001 | Suzuki et al. ................. 75/255 |

FOREIGN PATENT DOCUMENTS

| | | |
|---|---|---|
| DE | 42 37 543 | 5/1994 |
| EP | 0 161 494 | 11/1985 |
| GB | 952 510 | 3/1964 |
| GB | 2 089 700 | 6/1982 |
| JP | 11 036003 | 2/1999 |

OTHER PUBLICATIONS

Webster's II New Riverside University Dictionary.*
Injection Molding of Metals and Ceramics, Randall M. German and Animesh Bose (Metal Powder Industries Federation, Princeton, NJ 1997), pp. 22 & 51.

* cited by examiner

Primary Examiner—Ngoclan Mai (57) ABSTRACT

A process for adjusting the level of water or water soluble additives in aqueous-based powder injection molding compounds for the purpose of recycling scrap material, controlling shrinkage or rehydrating dry feedstock. Depending on the objective, the process may require material granulation equipment, equipment for the addition or removal of water and mixing equipment. The molding compounds may be comprised of either recycled scrap material before being heat-treated or dry, virgin feedstock material.

19 Claims, 6 Drawing Sheets

Optical Micrographs of Virgin and 15% Recycle

*Figure 7A*

Virgin Polished 100 X

*Figure 7B*

15% Recycle Polished 100 X

*Figure 7C*

Virgin Etched 100 X

*Figure 7D*

15% Recycle Etched 100 X

RECYCLE METHODS FOR WATER BASED POWDER INJECTION MOLDING COMPOUNDS

FIELD OF THE INVENTION

This invention relates to a process for adjusting the level of water or water soluble additives in aqueous-based powder injection molding compounds for the purpose of recycling scrap material, controlling shrinkage or rehydrating dry feedstock. Depending on the objective, the process may require material granulation equipment, equipment for the addition or removal of water and mixing equipment.

BACKGROUND OF THE INVENTION

Currently, water-based metal and ceramic injection molding compounds containing an agar binder are supplied to customers with a very tight tolerance on solids level of ±0.20 wt %. Meeting this specification requires shipping in waterproof containers and maintaining temperatures in a narrow range during shipping and storage. If these compounds were manufactured in pellet form and could be dried after compounding and shipped dry, shipping and storage could be greatly simplified. The pellets would then need to be rehydrated to specification levels prior to use in an injection molding process. Rehydrating the pellets at a user's facility would require additional equipment. However, a sophisticated user would be able to use water level or water-soluble additives to make minor adjustments to improve processability or to control the dimensions of the final heat-treated or sintered part.

The same process can be used to recycle scrap parts in the form of runners, rejected parts, start-up scrap and purge scrap generated from an injection molding process prior to sintering, known as "green" material. There is a strong economic incentive to recycle this green material, as it is fairly expensive. The green scrap material is first granulated and then rehydrated to specification levels, as discussed above with respect to the dry pellets. The recycle process results in an increase in flow as evidenced by the higher spiral flow results and a decrease in green strength. This loss of green strength, which may compromise removal from the mold, can be reversed by the addition of a water soluble additive such as calcium borate.

Shrinkage levels for powder injection molding materials is very high, typically about 16%. A common problem for injection molding manufacturers is meeting close dimensional tolerances for sintered parts. Some of the reasons for variation in shrinkage include (i) variation in material composition, (ii) variation in molding or sintering conditions, and (iii) improper design of the mold. Manufacturers generally do not want to make expensive changes to their molds, especially if they suspect that the variations may be transient. Also, they may not be willing or may not know how to make the required adjustments in molding and sintering conditions to achieve dimensional control. A better and more cost effective way to control shrinkage is to adjust the water level of the compound.

The present invention solves the problem of water loss in recycled parts or dry compound pellets by rehydration of the granulated recycled parts or pellets to the appropriate water level required to meet specification, in order to assure the proper material solids level. The invention also solves the problem of shrinkage control by allowing the water level to be adjusted either up or down to yield the desired shrinkage.

BRIEF SUMMARY OF THE INVENTION

The present invention provides a process for adjusting the water content of a water-based injection molding compound to specified levels in order to produce desired processing characteristics and product properties including the steps of providing a metal or ceramic powder-based molding compound, providing apparatus for the addition or subtraction of water to the compound, and measuring the water content in the compound to produce an optimum balance of injection molding process characteristics and product properties.

The present invention also provides a process for adjusting the level of water-soluble additives in a water-based injection molding compound to specified levels in order to produce desired processing characteristics and product properties including the steps of providing a metal or ceramic powder-based molding compound, providing apparatus for the addition or subtraction of water-soluble additives to the compound, and measuring the content of water-soluble additives in the compound to produce an optimum balance of injection molding process characteristics and product properties.

The molding compounds may be comprised of either recycled scrap material before being sintered or dry, virgin feedstock material.

BRIEF DESCRIPTION OF THE DRAWINGS

The invention will be more fully understood and further advantages will become apparent when reference is made to the following detailed description and the accompanying drawings in which.

DETAILED DESCRIPTION OF THE INVENTION

This invention provides a process for adjustment of the water level and the concentration of water-soluble additives of water-based injection molding compounds. The process can be used for scrap material before sintering, for dry virgin pellets and to adjust shrinkage of feedstock. Optimally, the first step in the process is exposing the material to a water-based rehydration solution until equilibrium water and additive levels are established between the material and the surrounding water. Trace additives, e.g. calcium metaborate (a processing aid) or biocides, are added to the rehydrating solution to give the desired processing characteristics and bacterial resistance to the equilibrated composition. In the case of scrap material, excess surface water is removed from the parts and the parts are then granulated using conventional equipment.

In actual experiments conducted using scrap parts from an injection molding project, moisture equilibration data taken on a variety of parts over temperatures ranging from about 4° C. to about 60° C. showed a small increase in the equilibrium moisture level with increasing temperature from 4° C. to about 40° C. and then an accelerating increase over temperatures ranging from about 40° C. to about 60° C. At temperatures higher than 80° C., the agar binder material in the parts dissolves. Based on the aforementioned data and the experience described in the Examples, it is preferred that the rehydration process be carried out at room temperature for several reasons. Carrying out the process at room temperature is easier to accomplish and is more convenient; the equilibrium moisture level is insensitive to temperature at or about room temperature; and finally, the equilibrated moisture level is generally slightly below specification at room temperature. The latter point means that partial surface drying, which is easier to accomplish than complete surface drying, will yield parts very close to the specified water level.

Figure 2:
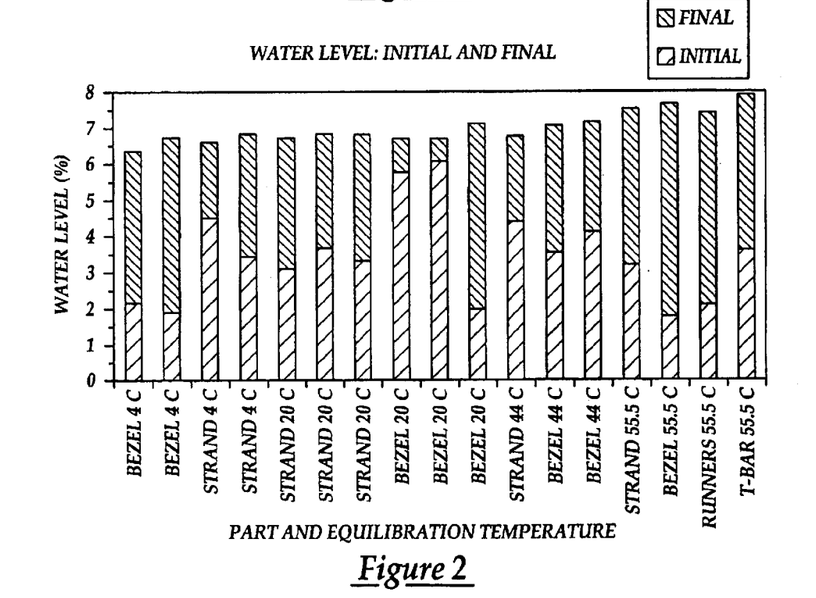
FIG. 2 is a graph showing that storage of scrap parts in a "wet" condition results in water levels that are slightly below specification.

This initial rehydration to equilibrium process has several advantages. Scrap with varying degrees of drying and thickness can be handled because, regardless of the initial water content or thickness, the final water concentration will be at the equilibrium value. FIG. 2 shows thick watch bezel parts and thin strands with varying initial water content (lower, light-colored bars) all equilibrated to the same approximate equilibrium value (higher, dark-colored bars), which is slightly dependent on temperature. The equilibrated material is softer and therefore easier to granulate and produces fewer fine particles, which are undesirable for injection molding because smaller particles tend to aggregate.

Figure 1:
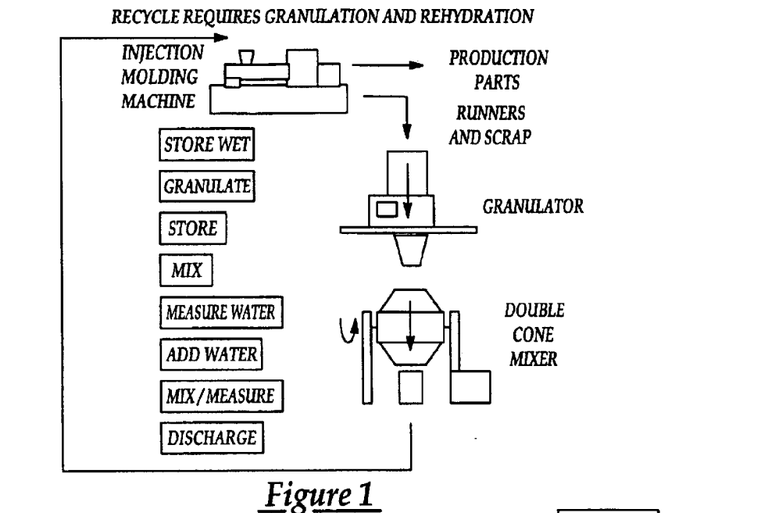
FIG. 1 is a schematic representation of an embodiment of the recycling process.

A preferred embodiment of the invention is a process involving optimal initial rehydration, granulation of scrap parts, and the addition of water in a mixer This equipment is shown in FIG. 1. The scrap parts are granulated using conventional plastics granulating equipment, and the granules are then tumbled to mix them thoroughly. The average water concentration in the batch is determined by sampling the mixture appropriately and averaging the measured water concentrations. The amount of water required to bring the batch to the specified water concentration level is calculated and then added to the batch by spraying over the surface of the granules. The granules are tumbled to distribute the water. The advantages of this process are that only one piece of equipment, a mixer, is required and the tumbling operation agglomerates the fine particles to form small particles, which are better suited for injection molding. Some disadvantages are that careful sampling is required to determine the proper amount of water to be added; extra fine particles are produced if dry material is granulated; and water concentration must be uniform in the final mixture.

Another embodiment involves granulating the scrap parts, drying the granules in an oven to remove all moisture, and then adding sufficient water to rehydrate the material to the specified level. This procedure removes the sampling requirements from the previous process, but requires the use of a drying oven, the addition of a large amount of water, and care to insure that the water addition and final concentration are uniform.

Batches having water levels that deviate from specification for any of the processes described above can be blended to produce an average water level that meets specification.

A third embodiment is the rehydration to equilibrium process. This process starts as the initial rehydration process described above, but special care is taken to produce rehydrated material that meets the final water specification or is sufficiently close so that it can be blended. A continuous process using an underwater conveyor is one method that can be used. The scrap parts are placed in the conveyor hopper, which is filled with rehydrating solution. After a sufficient amount of time for the parts to equilibrate, the conveyor is started and the low cleats move a few parts at a time up the inclined conveyor. The conveyor is enclosed, and fans operating at a controlled speed blow air over the parts moving up the conveyor. The moisture level of the parts leaving the conveyor is controlled by appropriately adjusting the conveyor speed and air velocity. The parts are fed directly to a granulator and the granules are collected and stored in closed containers for use as a molding compound. The process is well suited for automated operation and is appropriate for recycle rates of thousands of pounds per day. This type of automated continuous process can be fine-tuned to produce feedstock material within tight tolerances similar to the operation of a cooling conveyor on a conventional compounding line for water-based compounds.

An alternate version of the process can be used to rehydrate dry feedstock pellets. The dry feedstock pellets are metered onto a small conveyor at a location where the conveyor is underwater. The pellets are rehydrated for an appropriate amount of time (underwater distance along conveyor/conveyor speed) and then partially surface dried before entering the feed system of an injection molding machine. This type of feed system would be appropriate for a large scale operation including several injection molding machines.

Scrap parts can also be rehydrated in a batch process analogous to the continuous process described above. In a batch process, parts are exposed to the rehydrating solution, for example, by soaking in a container and then being subjected to a drying operation. To achieve uniform drying of the parts, the drying operation requires air flow or tumbling or both. The parts are then granulated in conventional equipment and stored in closed containers.

When only small amounts of material are to be reprocessed, for example, less than 40 pounds per day, a manual method for rehydrating the material can be advatageously employed. This process involves parts to be recycled in containers of rehydrating solution and allowing them to equilibrate. The parts are then placed on a screen and partially dried by air flow or other appropriate means. They are then granulated. After mixing the granulated material with water, the water content is measured. If an adjustment is required, the granulated material is further dried in an inclined rotating container exposed to moving air, or water is added, and the material is tumbled on a roll mill.

EXAMPLE 1

Four hundred pounds of unsintered, scrap golf putter parts made of water-atomized 17-4 stainless steel in an injection molding machine using the preferred granulation and rehydration process shown in FIG. 1 were used. The scrap parts were first sprayed with water to yield a typical water level of 7.7 wt %. Parts that were not water treated had water levels as low as 3.5 wt %. No toughening agent was present in the water used in this example. The parts were granulated in a conventional Cumberland plastics granulator with a ¼ inch screen. Granulate was stored in water-tight buckets, each containing about 50 lbs.

Water addition was accomplished using a 1.7 cu. ft. double cone mixer, the Rota-Cone REC-18 made by Paul O. Abbe Co. The mixer contains a stationary internal nozzle for adding water in the form of a mist. The mixer was charged with approximately 160 lbs. of granulate (60% fill factor). The mixer was rotated for at least five minutes at a speed of 23 RPM to thoroughly mix the charge. The charge was then sampled at least once at four locations to determine the average water content. The mixer continued rotating during the 10 minutes required to measure the water content using an Arizona Instruments analyzer. The amount of water necessary to be added to bring the water level to 8 wt % was determined from the measured samples and expected water levels based on a mean balance for the charged materials. The required amount of water was added intermittently (typical cycle: 15 sec. spray on, 45 sec. spray off) through the mist nozzle using compressed air. The mixer was rotated for at least 5 minutes and sampled for the first time. It was then rotated 10 minutes and sampled again. The two measurements were in close agreement for the three mixing trials. If the measured values were within 0.15% of the specified amount of 8 wt %, the rehydrated water was returned to the plastic buckets for molding. Otherwise the process was repeated starting with the water addition step. The rehydrated, recycled 17-4 compound was mixed with virgin 17-4 compound in designated proportions including 0% recycled material designated DC1-00 (virgin control), 15% recycled material designated DC1-15, 30% recycled material designated DC 1-30, 45% recycled material designated DC 1-45 and 100% recycled material designated DC1-100. "DC" indicates use of the Abbe double cone mixer; "1" indicates recycling one time; and "XX%" indicates the percentage of recycled material. In addition to the material prepared on the DC equipment, data are also repeated for 17-4 compounds recycled two and three times following the same process but using a closed container on a rolling mill to accomplish the mixing. These compounds, which were 100% recycled material, are designated RM2-100 and RM3-100.

Figure 3:
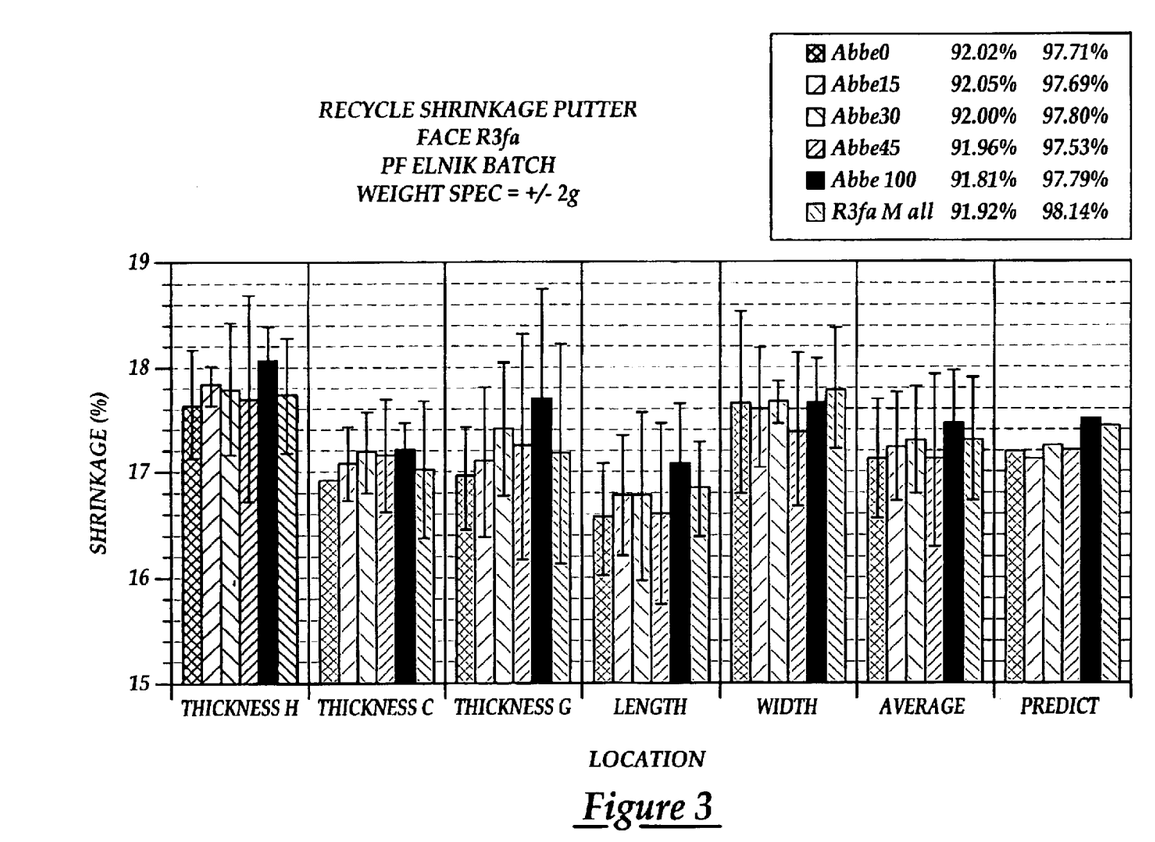
FIG. 3 is a graph comparing the shrinkage for golf putters made from recycled and virgin injection molding compound material.

Percent shrinkage measurements comparing the sintered dimensions to the mold dimensions are shown in FIG. 3 for three thickness, one width and one length measurement on an injection molded golf putter made from the above compositions. The predicted values were obtained from a model for shrinkage based on conservation of mass. They show the same trends as the measured average values. This data shows that there is no significant change in shrinkage with recycled content.

Figure 4:
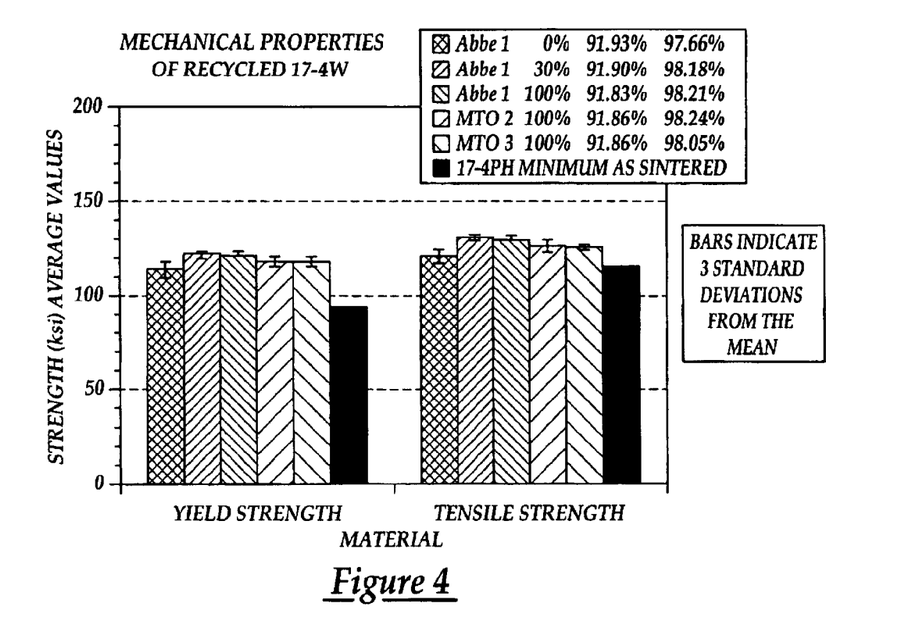
FIG. 4 is a graph showing the yield strength and tensile strength of tensile bar specimens made from recycled and virgin injection molding compound material after sintering.
Figure 5:
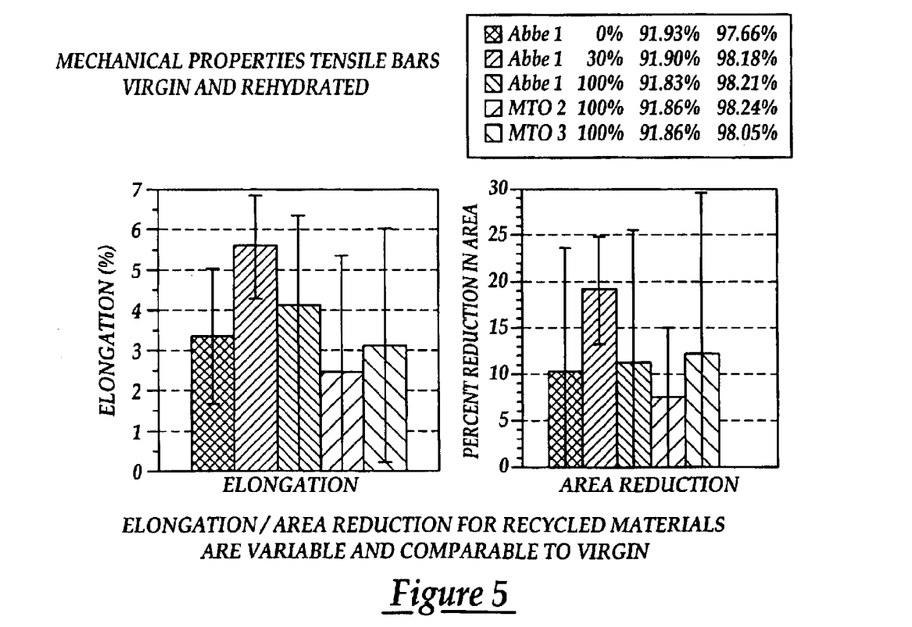
FIG. 5 are graphs comparing the elongation and reduction in area of tensile bar specimens made from recycled and virgin injection molding compound material after sintering.

Mechanical property data is shown in FIGS. 4 and 5 for tensile bars molded from the material in this Example. The tensile and yield strength data in FIG. 4 show that the recycled material has slightly higher properties than the virgin material, and the properties are above the minimum values given by Standard 35, "Materials Standards for Injection Molded Parts", 1993–94, Metal Powder Industries Federation, Princeton, N.J.

FIG. 5 shows that elongation and reduction in area values are comparable to the virgin control group although there is appreciable scatter.

Figure 6:
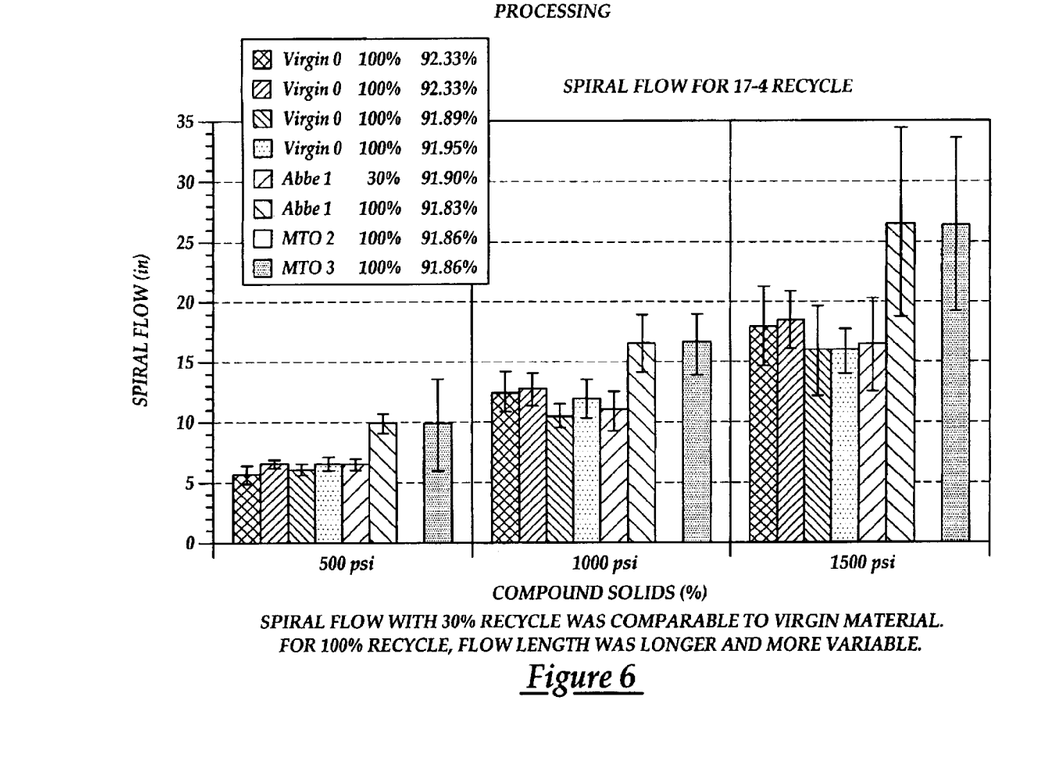
FIG. 6 is a graph comparing the spiral flow results for recycled and virgin injection molding compound material.
Figure 7A:
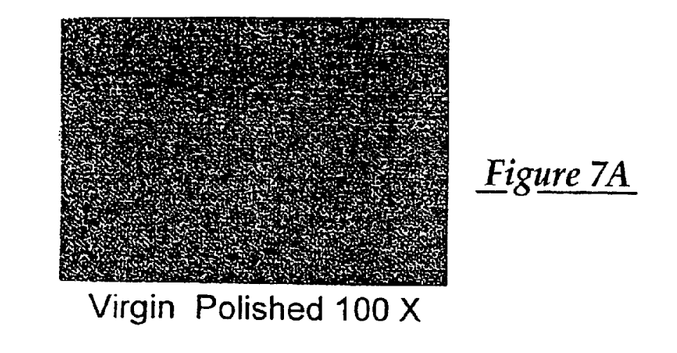
FIGS. 7A and 7B are untouched optical micrographs of 17-4PH stainless steel alloy as a virgin material (A) containing 15% recycled material, and (B) after sintering in a pusher furnace.
Figure 7B:
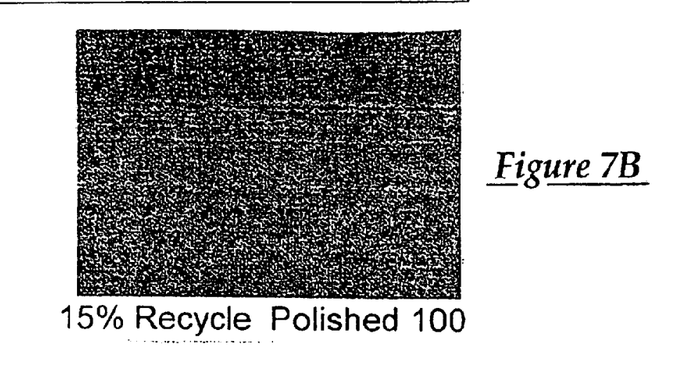
Figure 7C:
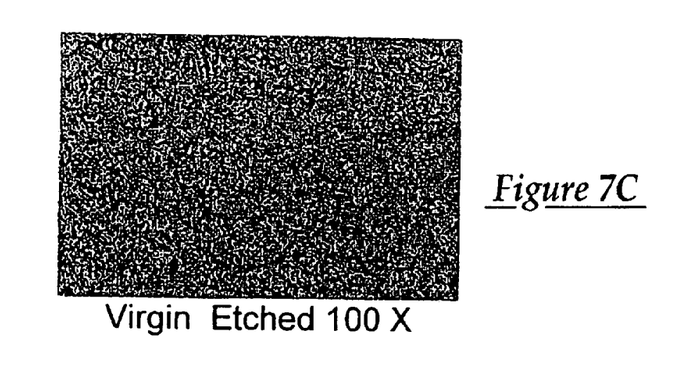
FIGS. 7C and 7D are etched optical micrographs of 17-4PH stainless steel alloy (C) as a virgin material, and (D) containing 15% recycled material.
Figure 7D:
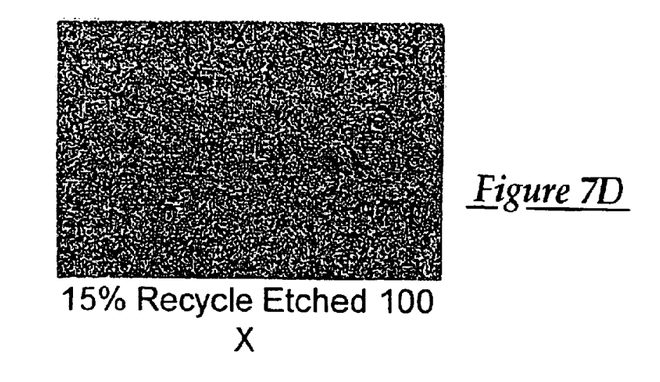

Flow properties of virgin and recycled material can be evaluated from the spiral flow data in FIG. 6. Spiral flow is an ASTM D3123-94 standardized test in which materials injected at 180° F. and 500, 1000 and 1500 psi flow until they stop flowing off in a curved channel in a mold at 72° F. This flow distance is measured and shown in FIG. 6 for various recycled compositions and several virgin control groups. It should be noted that the distance from the RM1-30 (30% recycled material) composition is similar to the virgin material, but that the 100% recycled compositions show 50% longer flow length. An increase in flow length is expected because the additional mechanical work during the recycle process will tend to break down the gel binder. There is also a possibility that calcium metaborate, a strengthening agent, may have leaked out of the compound during the recycle process.

Photo-micrographs at 100×magnification of cross-sections of golf putters are shown in FIG. 7. All parts were sintered under identical conditions in a hydrogen environment in a pusher (continuous) furnace. FIGS. 7A (virgin) and 7B (15% recycled material) show essentially the same levels of porosity and pore size distribution, which indicates no porosity differences between virgin and recycled material. FIGS. 7C and 7D, which are etched, show a uniform martinsitic structure in both samples, which indicates that these virgin and recycled materials have the same chemical and mechanical properties.

EXAMPLE 2

Scrap parts [composed of clips (37 g.), runners (920 g.) and watch cases (42 g.)] made from Honeywell International Inc. PowderFlo® compound based on a 17-4 stainless steel air atomized powder were collected and soaked in a rehydration solution containing 0.27 wt % calcium metaborate until an equilibrium condition existed. One batch (#42) was soaked at room temperature for 29 hours, and another batch (#45) was soaked at 45° C. for 15 hours. Equilibrium may have actually been achieved in shorter times.

Each rehydrated batch was surface dried in a closed cylindrical wire basket, which was rotated manually to give all parts equal exposure to an air jet moving along the outside surface of the basket. The drying operation was stopped when the parts were partially surface dried. Moisture measurements in an air oven and an automated instrument showed 7.28 and 7.31 wt % water for batch #42. The water levels for batch #45 were 7.18 and 7.28 wt %. The target water level was 7.4 ±0.2 wt %. The two batches were granulated separately in a Cumberland 3-knife 8"×10" granulator, and the regrind was stored in waterproof containers.

After one day, virgin material and the two regrind batches were injection molded on a 40-ton Arburg machine to form short tensile bars. The moldings were performed under standard conditions other than the need for manually assisted feeding for the regrind materials because of non-uniform granulate size. Stock temperatures in the molding machine were 92–93° C., which are in excess of 85° C., the temperature required to melt previously gelled material.

The quality of the recycled materials is judged by mechanical properties (tensile strength and yield strength) and by dimensional variations (shrinkages). These measurements are graphed as median (midpoint) values which are indicative of the typical values of the data without giving undue weight to outlying points, such as early failure due to a defect. The standard deviation, also shown on the graph, indicates the variability of the data and is very sensitive to outliers.

Figure 8:
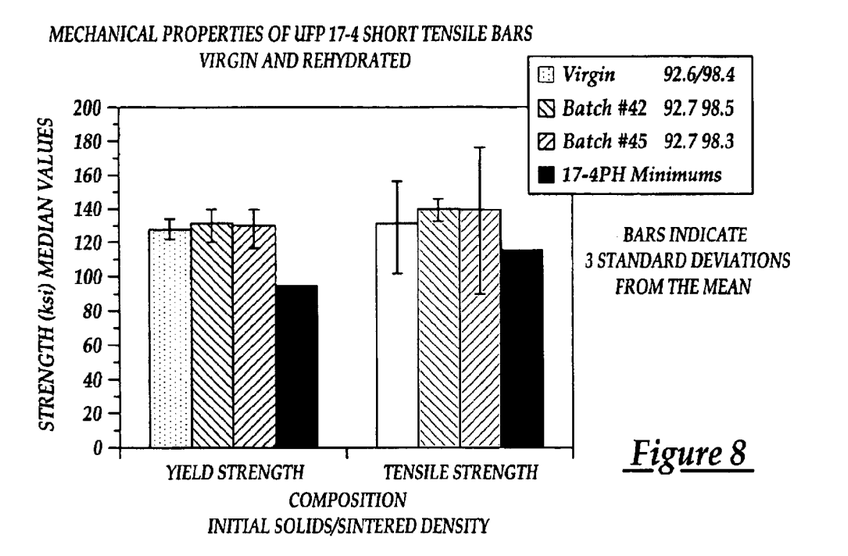
FIG. 8 is a graph showing the mechanical properties for the specimens of Example 2.
Figure 9:
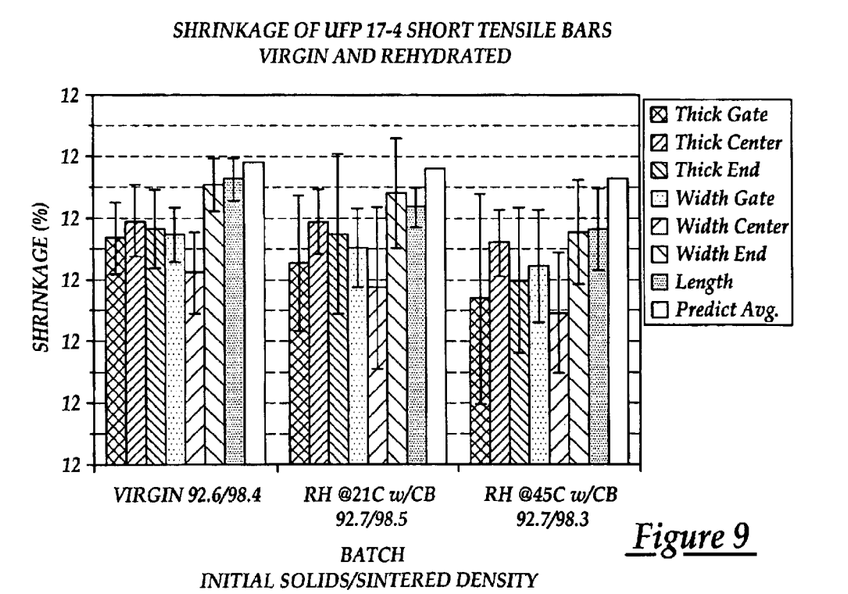
FIG. 9 is a graph showing the shrinkage for the specimens of Example 2.

Following sintering without heat treatment, ten tensile bars in each set (batches #42 and #45) and a control (virgin) part were tested for yield strength and tensile strength and for dimensional shrinkage. FIG. 8 shows that median values of yield strength and tensile strength are comparable for the virgin and recycled materials. Variability, as measured by standard deviation, was also comparable for the virgin and recycled materials although the standard deviation does show considerable variation. The shrinkage data in FIG. 9 also shows that the virgin and recycled material have similar shrinkage profiles, but the variation was somewhat higher for the recycled material. This result is attributed to variability in the injection molding process due to difficulties in the feed process.

EXAMPLE 3

A 17-4 atomized stainless steel compound with 91.3 wt % solids (8.7 wt % water) was dried in an open rotating inclined chamber with vanes to make two batches of compound with 92.0 and 92.5 wt % solids. These compounds were molded to form tensile bars and sintered under the same conditions. The average shrinkages were determined. By removing water, the average shrinkage of each compound was reduced as shown in Table 1 below.

TABLE 1

| Initial Solids % | Sintered Density % | Average Shrinkage % |
| --- | --- | --- |
| 91.3 | 98.8 | 18.7 |
| 92.0 | 98.7 | 18.0 |
| 92.5 | 98.5 | 17.0 |

EXAMPLE 4

Dry feedstock was prepared by drying 17-4 feedstock pellets in an air oven set at 75° C. for 16 hours to achieve a water level of approximately 0.1 wt %. The dry feedstock was rehydrated by two methods using two solutions of different composition.

The first rehydration method consisted of immersion of the dry pellets in deionized water for 16 hours, removing the excess water using a sieve, and adjusting the water level to the specified value by either (1) drying in an open rotating inclined chamber with internal vanes, or (2) adding a small amount of water using the method of Example 1.

The second method consisted of alternately spraying and mixing the dry pellets with either (1) deionized water, or (2) deionized water containing approximately 0.02% calcium metaborate as a strengthing agent. The pellets were allowed to equilibrate for one hour and then mixed to give a uniform composition.

The parts were molded in a conventional injection molding machine, and the green strength of the parts was determined by a creep tensile test immediately following molding. The molded part was subjected to a stress of 23 psi and allowed to elongate until it broke. The time it took to break was recorded. The number of short shots (incomplete mold filling because the pressure is insufficient) was also recorded for each set of conditions. The results are summarized in the Table 2:

TABLE 2

|  | No Drying Immersion | | Dried Feedstock Spraying | |
| --- | --- | --- | --- | --- |
|  | Control | Water Only | Water Only | Water w/Calcium Metaborate |
| Time to Break Avg. (sec.) | 45.9 | 43.8 | 38.4 | 223.8 |
| Time to Break Std. Dev. (sec.) | 26.0 | 7.5 | 7.0 | 117.0 |
| Short Shots/ Total Shots | 2/13 | 0/12 | 0/12 | 12/18 |

The data in the table above shows clearly that chemical modification of the feedstock by the addition of calcium metaborate in the rehydrating solution increases the green strength of the molded part, and as an unexpected but undesirable consequence, makes mold filling more difficult.

Having thus described the invention in rather full detail, it will be understood that various changes and modifications may suggest themselves to one skilled in the art, all falling within the invention as defined by the subjoined claims.

What is claimed is:

1. A process for adjusting the water content of a water-based injection molding compound to specified levels in order to produce desired processing characteristics and product properties including the steps of:
   a) providing a metal or ceramic powder-based molding compound;
   b) providing apparatus for the addition or subtraction of water to the compound;
   c) measuring the water content in the compound; and
   d) adjusting the water content of the compound by adding or removing water to produce an optimum balance of injection molding process characteristics and product properties.

2. The process of claim 1, wherein the molding compound is comprised of up to 100% unsintered recycled scrap material.

3. The process of claim 1, wherein the molding compound is comprised of dry, virgin feedstock material.

4. The process of claim 1, wherein the water content in the compound is about 8 wt %.

5. A process for adjusting the water-soluble additive content of a water-based injection molding compound to specified levels in order to produce desired processing characteristics and product properties including the steps of
   a) providing a metal or ceramic powder-based molding compound;
   b) providing apparatus for the addition or subtraction of water-soluble additives to the compound;
   c) measuring the content of water-soluble additives in the compound to produce an optimum balance of injection molding process characteristics and product properties; and
   d) adjusting the water-soluble additive content of the compound by adding or removing water-soluble additives to produce an optimum balance of injection molding process characteristics and product properties.

6. The process of claim 5, wherein the molding compound is comprised of up to 100% unsintered recycled scrap material.

7. The process of claim 5, wherein the molding compound is comprised of dry, virgin feedstock material.

8. The process of claim 5, wherein the water-soluble additive content of the molding compound is adjusted by immersing said compound in a solution containing water-soluble additives.

9. The process of claim 5, wherein the water-soluble additive content of the molding compound is adjusted by spraying a solution containing water-soluble additives on the molding compound.

10. The process of claim 5, wherein the injection molding process characteristic is green strength.

11. The process of claim 5, wherein the injection molding process characteristic is ease of flow.

12. The process of claim 5, wherein the product property is shrinkage.

13. The process of claim 1, wherein the water content of the molding compound is adjusted by immersing said compound in water.

14. The process of claim 1, wherein the water content of the molding compound is adjusted by spraying water on the molding compound.

15. The process of claim 1, wherein the injection molding process characteristic is green strength.

16. The process of claim 1, wherein the injection molding process characteristic is ease of flow.

17. The process of claim 1, wherein the product property is shrinkage.

18. A product made by the process of claim 1.

19. A product made by the process of claim 5.

* * * * *